United States Patent

[11] 3,596,692

| [72] | Inventor | Roy L. Swanke |
| --- | --- | --- |
| | | Newington, Conn. |
| [21] | Appl. No. | 850,183 |
| [22] | Filed | Aug. 14, 1969 |
| [45] | Patented | Aug. 3, 1971 |
| [73] | Assignee | Dynamics Corporation of America |

[54] EASY-OFF COUPLING
10 Claims, 8 Drawing Figs.

[52] U.S. Cl. .................................................. 146/68 A,
259/108
[51] Int. Cl. .................................................. A47j 43/08,
B02c 18/12, B02c 18/24
[50] Field of Search .......................................... 146/68 R,
68 A; 259/DIG. 26, DIG. 35, 108

[56] References Cited
UNITED STATES PATENTS

| 2,677,401 | 5/1954 | Schwancke .................... | 259/DIG. 35 |
| 3,458,175 | 7/1969 | Aoki et al. ..................... | 146/68 A X |

*Primary Examiner*—Willie G. Abercrombie
*Attorney*—Harbaugh and Thomas

ABSTRACT: Means are disclosed to lock a driven shaft through a wall of a vessel and to a flexible coupling adapted to interengage a drive shaft with a mating coupling at the extended end. The lock means comprises in one embodiment, a lever pivoted at one end to the driven shaft and positionable in a first unlocked position so that the longitudinal axis of the lever is aligned with the axis of the shaft and in a second locked position so that its axis is radial to the shaft, whereby the lever, in the aligned position can be withdrawn or inserted through a bore hole in rotatable member, and, in the radial position locks to the rotatable member. In one embodiment, a single lever can be provided and resilient means included to releasably retain the lever in the respective positions. In another embodiment a pair of levers can be used, each pivotable to a radial position opposite the other from a common axis. The locking levers are preferably flat elongated members proportioned so that their total thickness is such that they can be mounted edgewise in a recess within the driven shaft and that their effective width in unlocked position is no greater than the diameter of the driven shaft or no greater than the diameter of the bore hole upon which or within which they are carried.

Patented Aug. 3, 1971
3,596,692
2 Sheets-Sheet 1
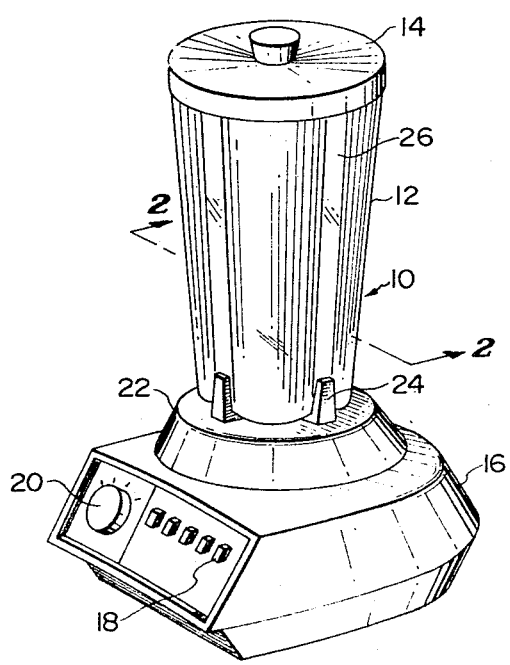
FIG. 1
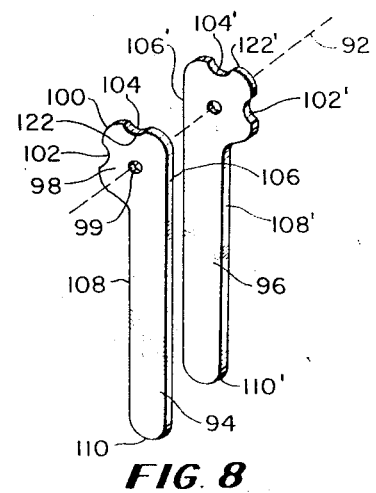
FIG. 8
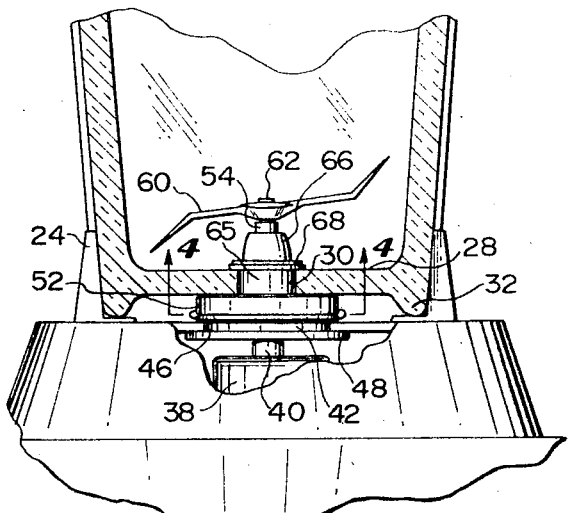
FIG. 2
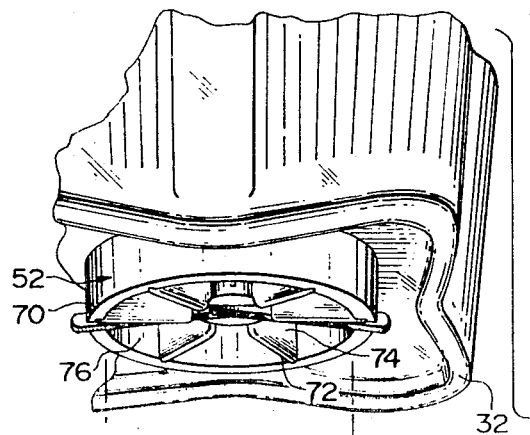
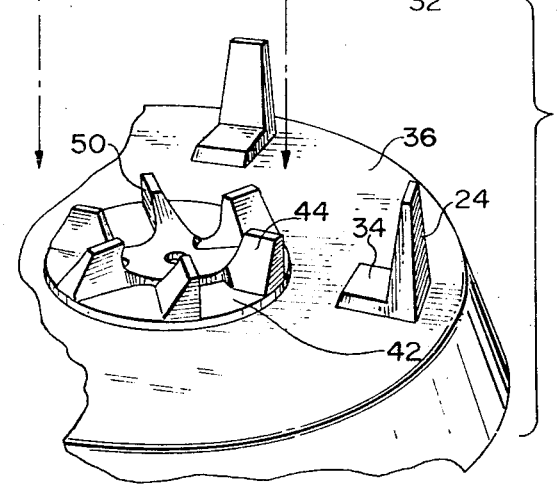
FIG. 3
INVENTOR
ROY L. SWANKE
By *Harbaugh & Thomas*
Attorneys Patented Aug. 3, 1971
3,596,692
2 Sheets-Sheet 2
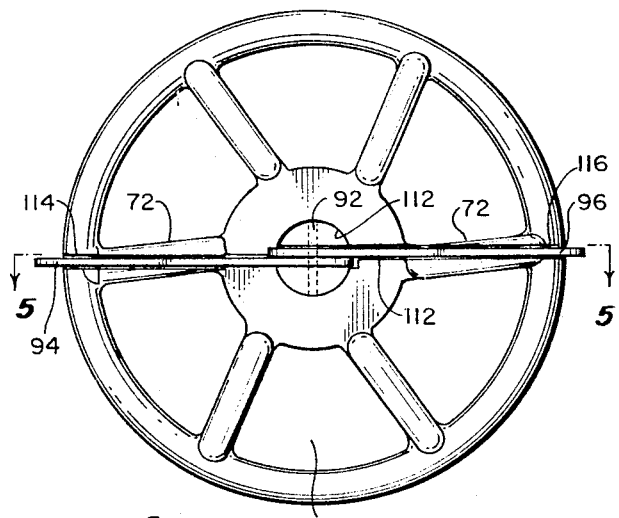
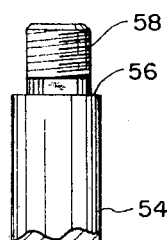
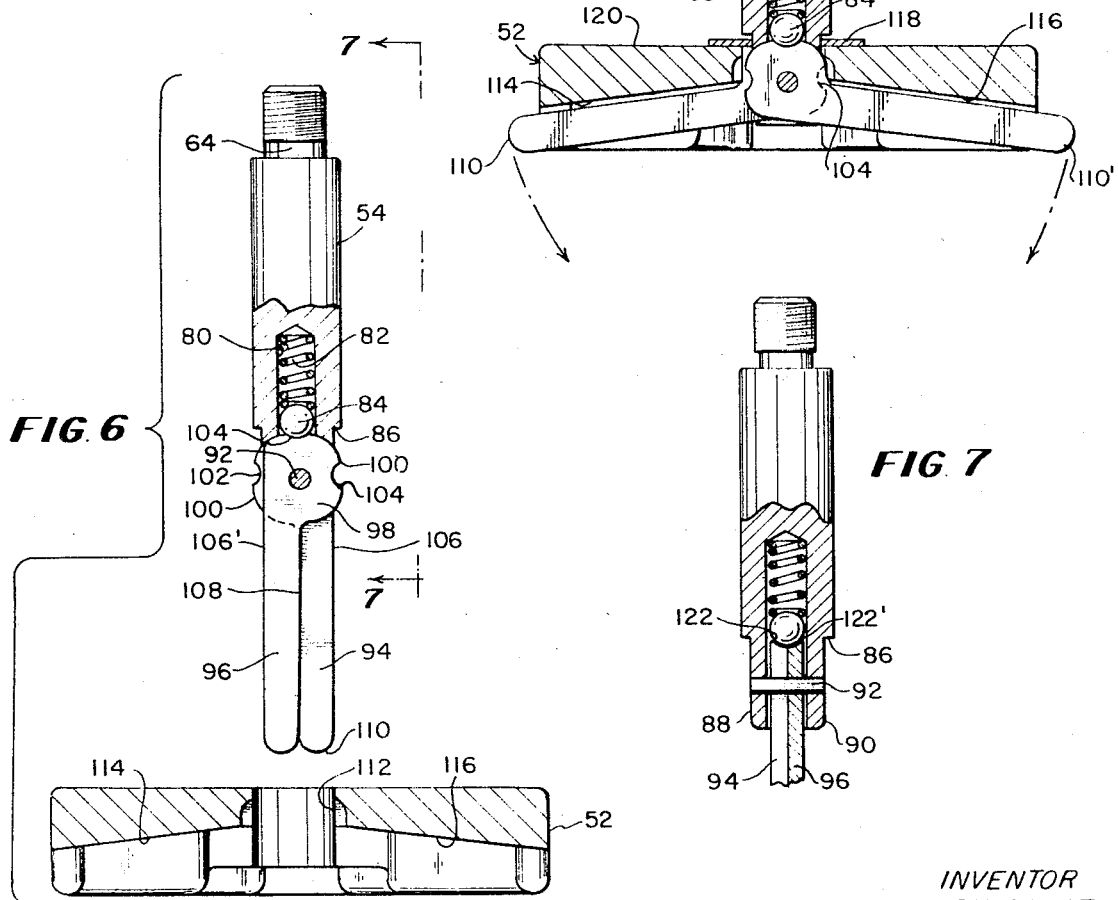
INVENTOR
ROY L. SWANKE
By Harbaugh & Thomas
Attorneys

EASY-OFF COUPLING

CROSS REFERENCES:

SWANKE et al., Appln. Ser. No. 766,280 Filed: Oct. 9, 1968

RAYMOND, Appln. Ser. No. 780,131 Filed: Nov. 29, 1968

BACKGROUND OF THE INVENTION

Detachable couplings between a drive shaft and a driven shaft are known in the art. Detachable members having one or more interengaging and resilient drive elements are used in liquidizers to provide positive drive connection, coaxial alignment, easy release and silent operation of high speed rotating parts. Liquidizers and related motor driven devices that operate at relatively high speeds of rotation are benefitted by specially designed detachable couplings provided with interengaging drive elements for purposes of eliminating such factors as misalignment uneven distribution of rotational mass and providing safe, silent operation. In such devices, as described in said copending and related applications supra, a base is provided to support the drive motor with the drive shaft extending within a recess in or lugs extending from the top of the base designed to receive the bottom of a receptacle. The drive shaft carries the coupler member for rotation just above the bottom of the recess in some embodiments. In any event the receptacle has the driven shaft mounted through the bottom wall with some form of coupler on the outer end and a cutter blade mounted on the inner end that is within the bottom confines of the receptacle. The respective couplers mate with each other in drive position when the receptacle is in position in the recess of the holder and are disengaged by merely lifting the receptacle from the base. Thus, the receptacles of such devices carry the driven shaft in their bottom wall with the cutter blade mounted within the bottom of the receptacle and the detachable coupling at the other or bottom end of the driven shaft.

Devices of this kind must be designed to provide the utmost of safety during attachment and detachment of the receptacle to the motor housing or base, whether the motor drive is actuated or not and whether the receptacle contains ingredients to be blended or liquified, that is, under both load and unload conditions. In addition, provision should be made for the easy disassembly of the driven shaft from the bottom wall of the receptacle so that these parts can be thoroughly cleaned from time to time or these parts replaced where necessary.

The instant invention concerns a liquidizer drive coupling and positive releasable lock means for the driven shaft assembly in the bottom of the receptacle and has for its objective the provision of a lock which is readily placed in the lock position, has no tendency to unlock during either normal or adverse operating conditions, is readily unlocked and whose parts are easily cleaned and reassembled.

SUMMARY OF THE INVENTION

In accordance with this invention, the end of the driven shaft, opposite the end supporting the cutter blade is provided with a radial cross shaft or diametric pin. A locking lever is pivotally mounted at one end to the cross shaft or pin, the lever being adapted to pivot from a first position wherein it is substantially coaxial with the driven shaft to a second position wherein the lever extends radially, or substantially radially from the outer end of the driven shaft. The driven shaft also carries, about or contiguous to the pivot point of the locking lever, a resilient coupling having driven elements or teeth on its bottom surface for engagement with the corresponding drive elements of a drive coupling carried by the drive shaft of the motor. The bottom surface of the driven coupling is provided with an elongated radial recess to receive and retain the locking lever in its second position. In one embodiment a single lever can be used at the outer or bottom end of the driven shaft carried by the receptacle. In the locked position the lever extends essentially in or slightly below the plane of rotation of the driven shaft about the pivot point so that centrifugal force either maintains the locking lever in position or tends to further pivot it against the resilient coupling in a locked position. The locking lever once in the locked position and engaged within the radial recess of the flexible coupling also locks the coupling to the driven shaft as a unit assembly so that the drive coupling when engaged therewith is coupled to, and can rotate the cutter blade.

In one embodiment means are provided such as a finger tab, or, having the outer end of the locking lever extend beyond the periphery of the driven coupling, or the like, so that the lever can be easily engaged at a convenient point by one's fingers to pivot the lever to the unlocked position.

In another embodiment a pair of levers are pivotally mounted from a common pivot point or fulcrum or from different coaxial pivot points, at the end of the driven shaft, each lever being pivotable to radially opposite positions for engagement with radial recesses in the underside of the resilient driven coupling.

In both embodiments, that is, using a single or double locking lever, means are provided to retain the locking levers, if desired, in their respective first and second positions. Such means include a spring loaded detent ball mounted within the driven shaft for engagement against the pivoting end of the lever or levers. In one embodiment the pivotally mounted end of the lever is provided with a radial cam having recesses in the cam surface adapted to be engaged by the resilient retaining means and hold the lever sequentially in the first and second positions, yet provide easy rotation of the lever to and from these locked positions. The shaft can also be provided with a shoulder against which the resilient coupling is held by the lever or levers in their locked position as an assembly for free rotation within the bore hole in the bottom wall of the receptacle. The effective area of the shoulder can be extended by interposing a spacing washer.

One particular advantage or feature of the invention is the elimination of threaded engagement between the driven shaft and the drive coupling, the elimination of supporting flanged collars on each side of the resilient coupling and the overall simplicity of parts which lock positively under centrifugal force. Another advantage is that even though one or both of the locking levers may be inadvertently positioned intermediate their lock and unlock positions, the levers are automatically pushed home to the locked position when the receptacle is placed upon the motor base. Another feature of the invention is that the locking levers in their unlocked positions become extensions of the driven shaft so that the bore hole of the resilient coupling is readily engaged therewith and one lever can be held in one hand while the flexible coupling is turned to register its recess with one lever and then is pivoted to the locked position. The lock lever, when not properly pivoted to the locked position interferes with the proper seating of the receptacle upon the motor mount base in such a manner that it signals the user of the incomplete lock and prevents use of the liquifier until it is properly pivoted.

DESCRIPTION OF THE DRAWINGS

Illustrative embodiments of the invention are shown in the attached drawings wherein:

FIG. 1 is a perspective view of a liquidizer device;

FIG. 2 is a fragmentary cross-sectional view taken along the lines 2–2 of FIG. 1;

FIG. 3 is a fragmentary perspective view showing the bottom of the receptacle and the top of the motor base with the parts in disengaged coaxially aligned relationship;

FIG. 4 is a bottom plan view of the subassembly comprising the resilient driven coupling and the driven shaft with the locking lever in the second or locked position;

FIG. 5 is a partial cross section view taken along the lines 5–5 of FIG. 4;

FIG. 6 is a partial sectional view of the driven shaft and the flexible coupling with these parts in disengaged coaxially aligned relationship;

FIG. 7 is a partial sectional view taken along the lines 7-7 of FIG. 6.

FIG. 8 is a perspective view of the locking levers used in the invention.

DESCRIPTION OF THE PREFERRED EMBODIMENTS

Referring to the drawings, FIG. 1 shows the liquidizer 10 which comprises the receptacle 12 with the detachable cover 14 and the motor base 16 provided with a front panel having speed control buttons 18 and the timer dial 20. The liquidizer base has the mounting support 22 on the top with radially positioned upstanding lugs or prongs 24 that are adapted to engage within the bottom ends of the longitudinal recesses 26 provided within the outer wall of the receptacle 12.

The bottom wall 28 of the receptacle 12 has a central bore 30 (FIG. 2) and the peripheral lobed flanged edge 32 which rests upon the flat bases 34 (FIG. 3) of the lug members 24 and is thus held slightly above the surface 36 of the mounting support 22. The receptacle is thus held in guided spaced nonrotational relationship upon the support 22.

The motor base 16 houses the drive motor 38 (FIG. 2) from which extends the drive shaft 40 carrying the lower drive coupler 42 in such a position that the resilient teeth or drive members 44 extend above the surface 36. The liquidizer base 16 is provided with a central opening 46 above which the drive coupler 42 extends and the assembly is held by any suitable means such as the mounting plate and bearing support 48, coaxially with the receptacle 12 when the latter is in place between the prongs 24. The plate 48 can retain a bearing (not shown) for the shaft 40. With the motor 38 operating, the drive coupler 42 is rotated counterclockwise, as viewed in FIG. 3, so that the flat surfaces 50 of the drive members 44 become the engaging surfaces for the driven coupler 52 carried on the driven shaft 54 by the bottom wall 28 of the receptacle. The driven shaft 54 (see FIG. 5) has the upper shoulder 56 and the reduced end portion 58 which is threaded and receives the cutter blade 60, held thereto by means of any suitable lock nut 62. As illustrated in FIG. 6, the driven shaft 54 can have the squared shoulder 64 to mate with the hub of the cutter blade 60 and lock the blade to the shaft. The bore 30 has the bearing 65 for the shaft 54 and is held as a separate unit to the bottom wall 28 by means of the lock nut 66 and washers 68. These parts not forming a part of this invention need not be further described, except insofar as they relate to the operability and utility of the device. The object of this invention is to provide a quick release for the unitized cutter blade and driven shaft assembly so that it can be removed for cleaning and then easily recoupled to the driven coupler 52.

Referring to FIGS. 3 and 5, it is seen that the driven coupler 52 has the circumferential outer wall 70 and a number of radial spokes 72 having the flat following faces 74 defining therebetween the segmented recesses 76. When the receptacle, in assembled condition as shown in FIGS. 2 and 3, is placed within the prongs 24 upon the base 22 each drive member or lug 44 of the drive coupler 42 seats itself within a corresponding recess 76 of the driven coupling with the flat surfaces 50 contiguous to the following surfaces 74. In this position the rotation of the drive coupling 42 by the motor 30 rotates the driven coupling 52 and the cutter 60 through the driven shaft 54 while the receptacle remains stationary in the manner described in said related patent applications.

In accordance with this invention means are provided to releasably lock the driven coupling 52 to the driven shaft 54 through the bottom wall 28 of the receptacle 12. Referring to FIG. 5 the shaft 54 has the blind bore 80 forming a housing for the compression spring 82 which seats upon the ball detent 84. The shaft 54 has the circumferential shoulder 86 and the extended bosses 88 and 90 carrying the cross pin 92 on which are pivotally mounted the locking levers 94 and 96.

As shown in FIG. 8 the levers 94 and 96 are essentially the same shape, thickness and dimensions and can in fact be stamped or otherwise formed from the same cutting machine or die. The lever 94 has the off-set lobe 98 with a central bore hole 99 rotatably engaging the pin 92. The lobe 98 has the outer circumferential cam surface 100 which is essentially circular except for the rounded detents or notches 102 and 104 and the straight side 106. The notch 102 and the notch 104 are circumferentially spaced from each other along the cam surface 100. The notch 104 is radially opposite the inner edge 108 of the lever 94 while the notch 102 is located less than 90° from the notch 104. Each of the notches 102 and 104 is uniform and the same depth, having contours which seat circumferentially against the surface of the detent ball 84. The notches 102 and 104 can be flat sided, V-shaped or have a cylindrical surface as desired as long as they function to lock the lever 94 into the respective positions. The levers 94 and 96 are flat as illustrated, although it is apparent that other configurations can be used. The edges 106 and 108 terminate in the rounded tip 110. The lever 96 is reversed in its relationship to the lever 94 in the assembly on the pin 92 so that corresponding parts, illustrated in prime numbers, are also reversed.

Referring to FIG. 7, the levers 94 and 96 are rotatably mounted side by side on the pin 92 between the bosses 88 and 90 and are adapted to be individually pivoted to the unlocked or aligned position shown in FIG. 6 wherein the respective notches 104 and 104' register with and engage the detent ball 84. In the unlocked position the levers have their axes substantially parallel to the axis of the shaft 54. The flat surfaces 108 and 108' face in opposite directions but in substantially the same plane on a line substantially coincident with the center of the shaft 54. In this unlocked position the flat surfaces 106 and 106' are facing outward and the combined effective diameter of the levers is no greater than and preferably slightly less than that of the shaft 54.

The driven coupling 52 has the central bore 112 which is adapted to receive both the shaft 54 and the levers 94 and 96 in their unlocked or aligned positions. The driven coupling has the elongated radial grooves or slots 114 and 116 extending from the bore 112 to the periphery. EAch of the spokes 72 of the driven coupling 52 is offset from the spoke on the opposite side therefrom and the slots 114 and 116 are molded or otherwise formed so as to pass through a pair of said off-set spokes so that a continuous diametric recess if formed in the coupling. The slots 114 and 116 have flat side and bottom walls the latter sloping downwardly toward the periphery of the coupling (as viewed in FIGS. 5 and 6). Thus with the levers 94 and 96 pivoted to the in-line position of FIG. 6, the shaft 54 (with the cutter blade attached) can be inserted through the bearing assembly 65 and through the coupling 52. Then the levers are aligned with the grooves 114 and 116 and pivoted to the locked position shown in FIG. 5. The washer 118 is interposed between the top surface 120 of the coupling and the shoulder 86 as shown in FIG. 5 to seat with the bearing assembly so that there is no interference between the coupling 52 and the bottom of the receptacle 12. The width of the levers 94 and 96 is such that they seat within the slots 114 and 116 with only limited circumferential spacing since their function is to transmit torque to the shaft 54. The ends 110 of the levers extend a short distance beyond the periphery of the driven coupling 52 so as to be accessible for the purpose of pivoting the levers to the unlocked position.

As shown in FIG. 7 the levers 94 and 96 pivot in guided relationship between the bosses 88 and 90 on the pin 92 and also that the notches 104 are contoured so that they form a pocket to receive the ball 84. In this instance the notches or recesses 102 and 104 are higher on their outside edges, such as the edges 122 so that when brought side by side in the reversed positions of FIG. 8 they combine to form a pocket into which the ball 84 fits.

From this description it is apparent that various modifications can be made in the disengageable drive coupling of this invention. The relative positions of the notches 102 and 104 on the cam surface 100 of the levers 94 and 96 can be varied to produce different angular positions of lock and unlock to accommodate different drive couplings. The opposed side surfaces of the lobes 98 can be recessed so that the levers 94 and 96, when assembled between the bosses 88 and 90, are no thicker than one of the levers. Only one locking lever can be used in which event the slot 114 would extend only from the bore 112 to the periphery through one of the spokes or cleats 72. A pin can be used in place of the ball 84 as the resilient locking means and any type of spring can be used.

These being rotating parts, some attention must be paid to the overall balance of the assembly. The device of this invention is applicable to the other motor driven assemblies where easy disassembly and assembly are necessary or desireable. The coupling members 42 and 52 need not be of the intermeshing type shown and other known couplings or clutch means can be used in combination with the quick release levers of this invention. The length of the levers is also subject to variation. It may be that design considerations preclude the presence of the extended ends 110, in which event provision can be made for a recess within the sidewalls of the slot 114 by means of which the levers can be grasped. Although the levers are locked in their radial positions by the ball detent and by centrifugal force, additional locking means for the levers can be used where any tendency to unlock due to thrust on the shaft 54 is present. Also the assembly shown in FIG. 5 can be used as a quick release coupling between rotatable parts without the use of the drive coupling 52. In this embodiment the shaft 54 can be a drive shaft and the coupling 52 can be a driven member such as a gear, grind wheel, fan and the like.

What I claim is:

1. In a liquidizer having a motor drive shaft extending from a base and a separable cutter-carrying driven shaft for attachment through the bottom wall of a receptacle, disengageable drive coupling means adapted to connect said shafts in coaxial relationship comprising:
   a coupling member having a central bore and radially extending spoke members adapted to detachably intermesh with a mating drive coupling carried on said drive shaft,
   said central bore of said coupling member adapted to receive an end portion of said driven shaft,
   lever means pivotally mounted at one end from the extended end portion of said driven shaft,
   said lever means being positionable to an axially aligned unlocked position wherein said driven shaft is removable from said central bore and from said coupling member and being positionable to a radial locked position into engagement with said coupling member.

2. A disengageable drive coupling means in accordance with claim 1 in which:
   said coupling member is provided with a radial recess adapted to receive and hold said lever in a locked position.

3. A disengageable drive coupling means in accordance with claim 1 in which:
   a pair of said pivotal lever means is provided at the extended end portion of said driven shaft and adapted to individually pivot to radial positions interlocked in said spoke members.

4. A disengageable drive coupling means in accordance with claim 3 in which:
   said coupling member has a pair of radial recesses to receive and hold said levers in the locked position.

5. A disengageable drive coupling means in accordance with claim 1 in which:
   said lever is provided with a lobed cam at its pivotally mounted end, and
   means are provided to resiliently engage said cam at selected points to hold said lever in the respective radial locked and aligned unlocked positions.

6. A disengageable drive coupling means in accordance with claim 5 in which:
   said resilient engaging means comprises a spring loaded detent in the end of said driven shaft riding on said lobed cam.

7. A disengageable drive coupling means in accordance with claim 1 in which:
   said shaft has a pair of spaced bosses,
   a cross pin carried by said bosses,
   a pair of lever means pivotally mounted side by side on said cross pin,
   said levers having a notched cam surface,
   a spring-biased detent in the end of said driven shaft, said detent engaging said cam surface,
   a pair of said notches being positioned so as to engage said detent and hold said levers in an axially aligned position with respect to said driven shaft and insertable through said central bore of said coupling member, and
   another pair of said notches being positioned so as to engage said detent and hold said levers in radial positions for interlocking with the underside of said coupling member.

8. In a liquidizer having a base-mounted motor drive with an upstanding driving coupling member and a container adapted to seal upon said base with a separable depending coupling member on its bottom wall in driving engagement with said first coupling member;
   a shaft having a cutter blade attached at one end with the other end adapted to be inserted through an aperture in the bottom wall of said receptacle and through said separable coupling member,
   a pair of lever members pivotally mounted on a transverse axis at the extended end of said shaft,
   said lever members each having a lobed cam surface about said transverse axis with a pair of detent notches radially disposed about said cam surface,
   one of the detent notches on each lever being disposed along the longitudinal axis of said lever, the other of said detent notches on each lever being disposed at an acute angle to said longitudinal axis,
   a spring biased ball detent disposed axially of said levers within said shaft and adapted to engage the first pair of said detent notches when said levers are each rotated so that their longitudinal axes are contiguous to said shaft and to engage the second pair of said detent notches when said levers are rotated outwardly to a radial position from said shaft,
   the effective diameter of said levers in the first position being less than the effective diameter of said shaft whereby to be insertable through the aperture of said container, and
   said coupling member having diametrically opposed radial recesses on its under side to receive said levers in the second position and lock said coupling member to said shaft.

9. The combination called for in claim 8 wherein:
   the ends of said levers extend beyond the periphery of said coupling member.

10. The combination called for in claim 8 wherein:
    said detent notches on said lobed cam surfaces of said levers are contoured so as to form in their registered positions a pocket to receive a portion of the surface of said ball detent.